United States Patent
Cai et al.

(10) Patent No.: US 8,032,343 B2
(45) Date of Patent: Oct. 4, 2011

(54) METHOD OF OPTIMIZING WELD DESIGN FOR CONCURRENT CONSIDERATION OF PERFORMANCE AND MANUFACTURING REQUIREMENTS

(75) Inventors: Wayne W. Cai, Troy, MI (US); Robert Bruce Tilove, Rochester Hills, MI (US); Gopalakrishna Shastry, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 525 days.

(21) Appl. No.: 12/178,689

(22) Filed: Jul. 24, 2008

(65) Prior Publication Data

US 2010/0023150 A1      Jan. 28, 2010

(51) Int. Cl.
   *G06G 7/48*   (2006.01)
(52) U.S. Cl. .......................................................... 703/7
(58) Field of Classification Search .................. None
   See application file for complete search history.

(56) References Cited

U.S. PATENT DOCUMENTS

| | | | | |
|---|---|---|---|---|
| 5,729,463 A | * | 3/1998 | Koenig et al. | 700/98 |
| 5,910,894 A | * | 6/1999 | Pryor | 700/95 |
| 6,766,206 B1 | * | 7/2004 | Jasuja et al. | 700/98 |
| 6,789,051 B1 | * | 9/2004 | Chen et al. | 703/2 |
| 2002/0134816 A1 | * | 9/2002 | Chen et al. | 228/103 |

* cited by examiner

*Primary Examiner* — David Silver
(74) *Attorney, Agent, or Firm* — Quinn Law Group, PLLC

(57) ABSTRACT

A method of weld design for a work piece is provided. The work piece may be a unitary piece or a multi-component piece. The method includes determining a manufacturing feasible region of the work piece satisfying one or more predetermined manufacturing requirements including accessibility of welding components. The method includes determining a performance feasibility function satisfying one or more predetermined performance factors as applied in a performance simulation of the work piece. The workpiece may have a varying number of welds. An optimized weld design may be determined by minimizing an objective function, defined as a summation of the number of welds and the performance feasibility function, within the manufacturing feasible region. The optimized weld design is configured to have a minimum number of welds, and concurrently satisfy the predetermined manufacturing requirements and the performance factors.

20 Claims, 2 Drawing Sheets

| DESIGN VARIABLES | | RESPONSE |
|---|---|---|
| $x_1$ | $x_2$ | AVERAGE SECTIONAL REACTION FORCE DURING IMPACT (N) |
| $(x_1)_0 - \Delta_1$ | $(x_2)_0 - \Delta_2$ | 1500 |
| $(x_1)_0 - \Delta_1$ | $(x_2)_0$ | 1450 |
| $(x_1)_0 - \Delta_1$ | $(x_2)_0 + \Delta_2$ | 1380 |
| $(x_1)_0$ | $(x_2)_0 - \Delta_2$ | 1540 |
| $(x_1)_0$ | $(x_2)_0$ | 1490 |
| $(x_1)_0$ | $(x_2)_0 + \Delta_2$ | 1430 |
| $(x_1)_0 + \Delta_1$ | $(x_2)_0 - \Delta_2$ | 1620 |
| $(x_1)_0 + \Delta_1$ | $(x_2)_0$ | 1550 |
| $(x_1)_0 + \Delta_1$ | $(x_2)_0 + \Delta_2$ | 1505 |
FIG. 1B
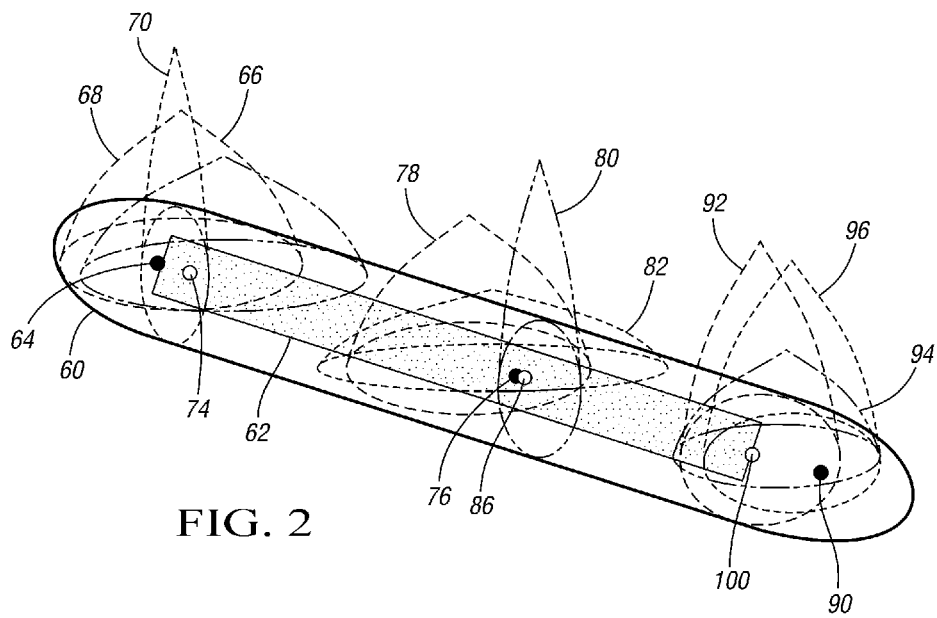
FIG. 2
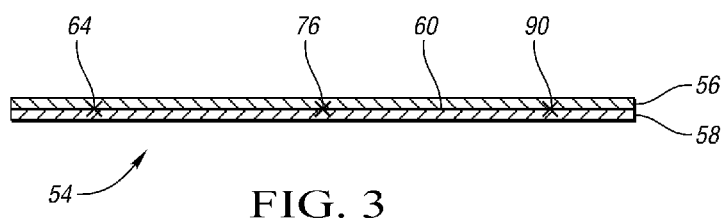
FIG. 3

METHOD OF OPTIMIZING WELD DESIGN FOR CONCURRENT CONSIDERATION OF PERFORMANCE AND MANUFACTURING REQUIREMENTS

TECHNICAL FIELD

The invention relates in general to a method for optimizing weld design.

BACKGROUND OF THE INVENTION

Resistance spot welding is a common welding process for sheet components. Spot welding involves the joining of two or more metal components together in a localized area by the application of heat and pressure. An electrical current is passed through the metal parts, generally with a weld gun, generating heat within the material by the resistance to the current. Traditionally, weld design in the context of vehicle development is an iterative process, with each cycle of weld design involving a new iteration of vehicle performance evaluation as well as manufacturing requirements analysis.

SUMMARY OF THE INVENTION

A method of weld design for a work piece is provided. The method includes determining a manufacturing feasible region of the work piece satisfying one or more predetermined manufacturing requirements including accessibility of welding components. The method also includes determining a performance feasibility function satisfying one or more predetermined performance standards as applied in a performance simulation of the work piece.

In a first embodiment, the workpiece may have a varying number of welds and an optimized weld design may be determined by minimizing an objective function, defined as a summation of the number of welds and the performance feasibility function, within the manufacturing feasible region. The optimized weld design is configured to have a minimum number of welds, and concurrently satisfy the predetermined manufacturing requirements and the performance factors.

In a second embodiment, the optimized weld design may be determined by minimizing the performance feasibility function, within the manufacturing feasible region. The optimized weld design is configured to concurrently satisfy the predetermined manufacturing requirements and the performance factors. In both embodiments, a controller, such as a computer, may be used to perform the determination of the manufacturing feasible region, performance feasibility function and optimized weld design. The controller may have the capability of reading from a computer-readable storage medium, such as a disk.

The work piece may be a unitary piece or a multi-component piece. The method may include selecting an initial weld design as an input to the method. The method may include entering the geometric characteristics of the work piece as an input to the method.

The predetermined manufacturing requirements may include welding standards. A fixture may be used to hold the work piece during welding; and the predetermined manufacturing requirements may include a fixture accessibility requirement. A weld gun may be used to weld the work piece; and the predetermined manufacturing requirements may include a weld gun accessibility requirement. A robot may be used to operate the weld gun; and the predetermined manufacturing requirements may include a robot accessibility requirement.

Determining the performance feasibility function may include formulating a plurality of performance indices representing performance standards; and determining performance response surfaces for each of the performance indices. The performance function may be calculated as a weighted summation of the performance response surfaces, such that the performance feasibility function is a weighted composite performance index.

Determining the performance response surfaces may include: carrying out performance simulation for each of the performance indices; and employing a virtual Design of Experiments algorithm for inputting results of the performance simulation for each of the performance indices. The performance response surfaces may be generated through output of the virtual Design of Experiments algorithm.

The performance indices may include a crashworthiness performance index. The response surface of the crashworthiness performance index may be generated as a weighted summation of response surfaces for a plurality of crashworthiness sub-factors. The crashworthiness sub-factors may include: frontal impact with a rigid barrier; side pole impact; rear impact; and rollover occupant simulation.

The performance indices may include a noise-vibration-harshness performance index. The response surface of the noise-vibration-harshness performance index may be generated as a weighted summation of response surfaces for a plurality of noise-vibration-harshness sub-factors. The noise-vibration-harshness sub-factors may include: normal mode analysis; harmonic excitation response analysis; and static and dynamic stiffness analysis.

The performance indices may include a structure performance index. The response surface of the structure performance index may be generated as a weighted summation of response surfaces for a plurality of structure sub-factors. The structure sub-factors may include: static stress and deformation analysis for a fuel tank; and displacement analysis for a door assembly.

The performance indices may include a dimension performance index. The response surface of the dimension performance index may be generated as a weighted summation of response surfaces for a plurality of dimension sub-factors. The dimension sub-factors may include: variation analysis for compliant assemblies; and welding sequence analysis.

A computer-readable storage medium containing a set of instructions for a general purpose computer for enabling a method of weld design for a workpiece is provided. The set of instructions include instructions for determining a manufacturing feasible region of the work piece satisfying at least one predetermined manufacturing requirement including accessibility of welding components. The set of instructions include instructions for determining a performance feasibility function for the work piece satisfying at least one predetermined performance factor as applied in a performance simulation of the work piece. The set of instructions include instructions for determining an optimized weld design by minimizing the negative of the performance feasibility function within the manufacturing feasible region, the optimized weld design being configured to concurrently satisfy the predetermined manufacturing requirement and the performance factor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1B is a table of an example of a hypothetical two-variable, three-level Design of Experiments study with a single output;

FIG. 2 is a schematic representation of a sample result of the method illustrated in the flow diagram of FIG. 1A, in accordance with one embodiment of the invention; and FIG. 3 is a schematic cross-sectional diagram of a work piece, in accordance with one embodiment of the invention.

DESCRIPTION OF THE PREFERRED EMBODIMENTS

Figure 1A:
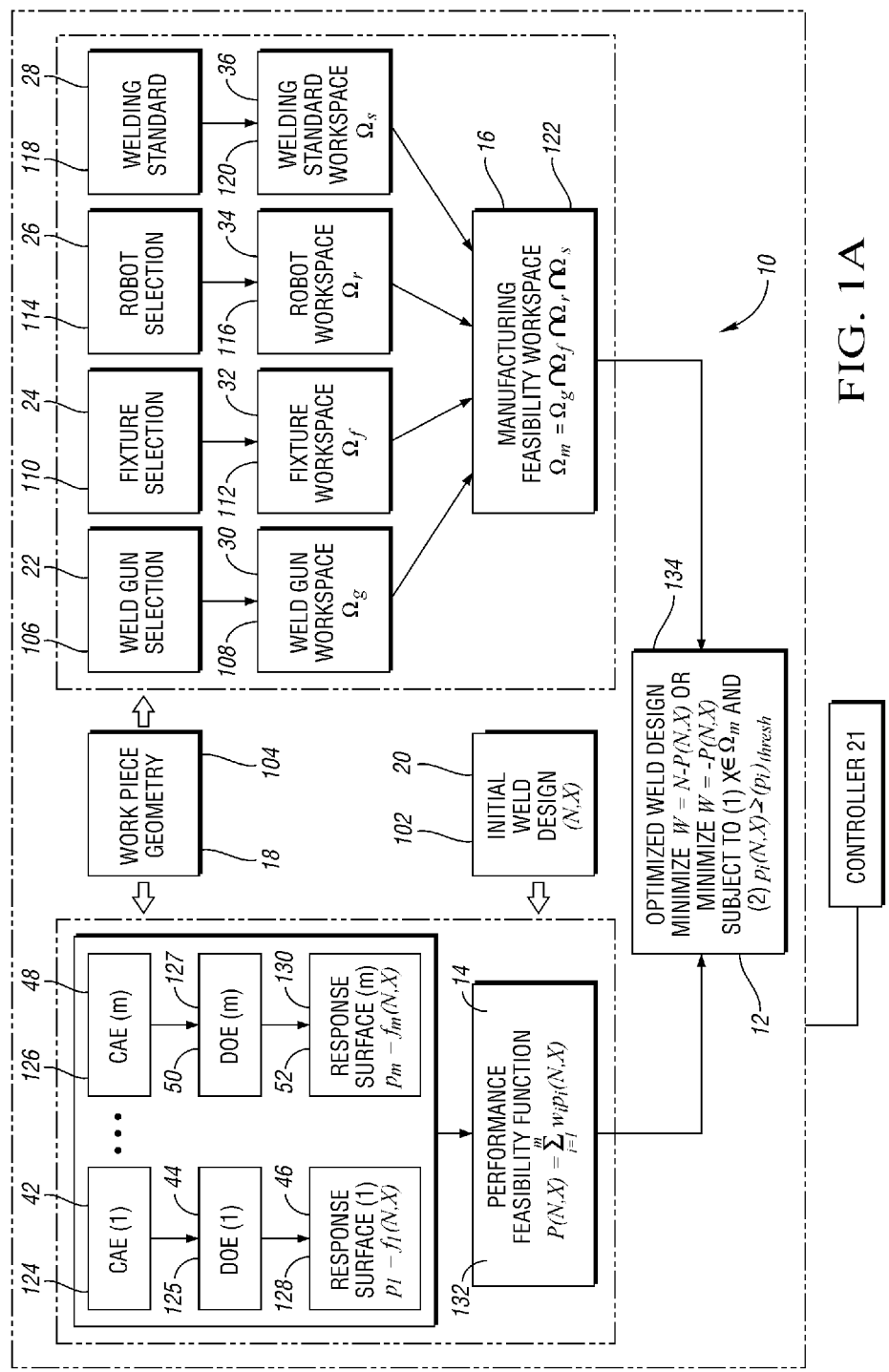
FIG. 1A is a schematic flow diagram illustrating the method of weld design in accordance with one embodiment of the invention.

A method of weld design is provided. "Weld design" refers generally to the location of the spot weld placement on a vehicle. Optimization of the weld design includes determining the physical location of each weld point, the optimal number of weld points and may include other factors. The work piece may be a unitary piece or a multi-component piece such as a sub-assembly, an assembly, or a whole vehicle structure.

The method includes determining a manufacturing feasible region, referred to herein as the "Manufacturing Feasibility Workspace," satisfying one or more predetermined manufacturing requirements for the work piece. The method also includes determining a "Performance Feasibility Function" which satisfies one or more performance factors as determined in performance simulations of the work piece. Note that the determination of the Manufacturing Feasibility Workspace and Performance Feasibility Function can be sequential, in any order, or concurrent.

FIG. 1A is a schematic flow diagram illustrating the elements of a method 10 of weld design. In a first embodiment, the Optimized Weld Design 12, is determined by minimizing an objective function, W, defined as the summation of the total number of welds N and the negative of the Performance Feasibility Function 14, denoted by P(X). In a second embodiment, the Optimized Weld Design 12, is determined by minimizing negative of the Performance Feasibility Function 14, denoted by P(X), and described below.

In both embodiments, the Optimized Weld Design 12 satisfies the Manufacturing Feasibility Workspace 16, denoted by $\Omega_m$ (that is, X is an element of the Manufacturing Feasibility Workspace 16 or $X \in \Omega_m$). The Optimized Weld Design 12 is also subject to a threshold requirement for performance. Performance is considered feasible only if the response surfaces for each performance index (described below) exceed a threshold value.

The work piece geometry 18 and an initial weld design 20 are set as inputs to the method 10, shown in FIG. 1A. The work piece geometry 18 may be represented by a simulated model, such as a Computer-Aided-Design (CAD) model. The initial weld design 20 can be an existing design from earlier design iterations, or it can be a new design where validation has not been performed. The initial weld design 20 can also be randomly generated, or based on certain design rules or guidelines such as weld density.

In the first and second embodiments, a controller 21, such as a computer, may be used to perform the determination of the Manufacturing Feasibility Workspace 16, the Performance Feasibility Function 14 and the Optimized Weld Design 12. The controller may have the capability of reading from a computer-readable storage medium, such as a disk.

Manufacturing Feasibility Workspace

As noted above, the Manufacturing Feasibility Workspace (shown at block 16) refers to a weldable region that satisfies each of multiple manufacturing requirements for the work piece. The welding process generally includes a work piece that is welded with a weld gun and a fixture for holding the work piece. A robot is typically used for handling the weld gun. In the embodiment shown in FIG. 1A, a particular weld gun, fixture, robot and welding standards are selected for the welding process. The weld gun selection, fixture selection, robot selection and welding standards selected are shown at blocks 22, 24, 26 and 28, respectively. Additional factors affecting manufacturability may be added.

The Manufacturing Feasibility Workspace 16 is established by intersecting several manufacturing workspaces. "Intersecting" refers to determining a sub-region common to each of the manufacturing workspaces. A "workspace" refers to regions on the work piece that are "weldable," i.e., regions that satisfy manufacturing tooling requirements and standards. For example in the case of a sheet metal, the "weld gun workspace" refers to the surface areas of the sheet metal that can be accessed or reached by the weld gun, without colliding with other components.

The weld gun selection 22 results in a weld gun workspace 30, denoted by $\Omega_g$. The weld gun workspace 30 refers to regions on the work piece that can be physically accessed or reached by the weld gun, without colliding with other components. The other components may be a different part of the work piece, the fixture, robot or any other component. Fixtures may cause collisions with the weld gun and the robot. Further, mounting weld guns onto a robot may cause additional constraints due to the robot kinematics and geometry.

The fixture selection 24 results in a fixture workspace 32, denoted by $\Omega_f$. The fixture workspace 32 refers to regions on the work piece that can be physically accessed or reached by the fixture, without colliding with other components. The robot selection 26 results in a robot workspace 34, denoted by $\Omega_r$. The robot workspace 34 refers to regions on the work piece that can be physically accessed or reached by the robot, without colliding with other components. The welding standards 28 results in a welding standards workspace 36, denoted by $\Omega_s$. The welding standards workspace 36 refers to minimum welding requirements, examples of which are given below.

The Manufacturing Feasibility Workspace 16 is the intersection of the weld gun workspace 30, fixture workspace 32, robot workspace 34 and the welding standards workspace 36. Thus the Manufacturing Feasibility Workspace 16 represents a common region in which multiple manufacturing requirements are satisfied, for geometric accessibility, reachability and minimum welding standards, while avoiding collision between components.

Note that the welding standards 28 include, but are not limited to: (a) minimum thickness for a sheet metal, for example, thickness should be greater than 0.50 mm; (b) specific thickness ratio for the metal stackup; (c) total stack-up thickness to be within a certain range; (d) checking the material type for features such as sealer, molding or adhesives, or the presence of forbidden materials; (e) minimum design gap between sheets; (f) flange width requirements; (g) minimum distance between weld points (i.e., spot weld spacing); (h) distance a weld point must be from certain features on the work piece, e.g., a hole; and (i) curvature of the work piece.

Performance Feasibility Function

The "Performance Feasibility Function," shown at block 14, is calculated as a weighted summation of one or more performance response surfaces, as explained below. The response surfaces are generated for each of respective performance indices, shown at blocks 46 and 52. The generation of response surfaces involves an integration of virtual performance simulation and virtual Design of Experiments methodology.

Virtual Design of Experiments

Design of Experiments (DOE) is a methodology for setting up a set of experiments in which all input variables are varied in a systematic manner, for the purpose of determining the correlation between input variables and to predict results or output. Using DOE, one can use factorial experiments to efficiently evaluate the effects and possible interactions of multiple independent variables, as opposed to the one-factor-at-a-time method. The experiments can be physical tests or computer simulations where the DOE is called the "Virtual DOE" or vDOE. The simplest, but most powerful DOE tool is the two-level factorial design, where each input variable is varied between a high and a low level and the output observed for resultant changes. Statistical analyses such as analysis of variances, or ANOVA, can then help determine which inputs have the greatest effect on the output. Thus, the use of DOE software or algorithms enables a systematic investigation of the influence of multiple variables.

By way of example only, FIG. 1B shows a table of an example of a hypothetical two-variable, three-level Design of Experiments study, with a single output or response. In this simplified example, the weld design has two weld points, $x_1$ and $x_2$. Here, $(x_1)_0$ and $(x_2)_0$ are the one-dimensional coordinates for the initial positions of the first and second weld points (being a one-dimensional case, y and z components are not necessary). In this particular example, N is fixed at two. Delta one and two ($\Delta_1$ and $\Delta_2$) are the amount by which the initial weld design is perturbed. Each weld position is varied between three levels and the output is observed for resultant changes. FIG. 1B shows an output or response $p(x_1, x_2)$ representing crashworthiness (e.g. p=1500 N where $x_1=(x_1)_0-\Delta_1$ and $x_2=(x_2)_0-\Delta_2$; p=1450 N where $x_1=(x_1)_0-\Delta_1$ and $x_2=(x_2)_0$; p=1490 N where $x_1=(x_1)_0$ and $x_2=(x_2)_0$ etc). The response surface is a plot of the output or response with respect to the positions of the two weld points, $x_1$ and $x_2$. Typically, the response surface is assumed to be a polynomial function where the constants are determined by evaluating the response surface at certain specified sampling points. In this case the response surface $p(x_1, x_2)$ is:

$$p(x_1,x_2)=C_1 \cdot x_1+c_2 \cdot x_2+c_3 \cdot v_1^2+c_4 \cdot x_2^2+c_5 \cdot x_1 \cdot x_2$$

Note that there may be more than one output or response observed for the same set of perturbations. In DOE, the input variables can also be the number of welds N associated with either a welding flange, a welding zone, or the entire welding structure. In this case, the response surface will be a plot of the output or response, with respect to the number of weld points as well as the position (N, X).

Determination of Performance Feasibility Function

In the embodiment shown in FIG. 1A, the performance indices are selected to be: crashworthiness, noise-vibration-harshness assessment (NVH), structure and dimension. Other factors may also be used. The design variable to be optimized is the total number of welds (N), and physical location of each weld point. The locations of the first to the Nth weld are denoted collectively by vector X, where $L_N$ is the location of the Nth weld point. The representation below is in Cartesian coordinates. However, curvilinear, polar, intrinsic, or any other coordinate system can also be used.

$$X=[L_1,\ldots,L_i,\ldots L_N], \text{ where } L_i=[x_i, y_i, z_i]$$

First, performance evaluations are carried out through virtual vehicle simulations, given an initial weld design (i.e., having total number of welds N, and the initial locations of each of the welds being X). Taking the first performance index to be crashworthiness, virtual simulation is carried out for crashworthiness, represented by CAE(1) and shown at block 42. Computer-aided engineering (CAE), which is the use of software tools and computer simulations in engineering, may be used to run the virtual performance assessments. Software such as LSTC's Dyna-3D may be used for the virtual crashworthiness assessment. Any other suitable software may be used. The simulation is carried out with respect to varying values of X.

The results of the virtual simulation CAE(1) are inputted into a virtual Design of Experiments table, software or algorithm (referred to herein as "vDOE"), represented by vDOE (1) and shown at block 44. The output of the vDOE(1) algorithm determines the Response Surface (1) for the first performance index, represented by $p_1=f_1(N, X)$ and shown at block 46. Software such as SAS-JMP may be used for the virtual Design of Experiments methodology. Any other suitable software may be used.

Taking the second performance index to be noise-vibration-harshness, virtual simulation is carried out for noise-vibration-harshness with respect to varying values of N and X. Software such as MSC/Nastran may be used for the virtual noise-vibration-harshness assessment. The results of the virtual vehicle simulations, represented by CAE(2) (not shown in FIG. 1A), are inputted into a vDOE algorithm, represented by vDOE(2) (not shown in FIG. 1A). The output of the vDOE(2) algorithm determines the Response Surface (2) (represented by $p_2=f_2(N, X)$) for the second performance index.

The analysis is repeated for each performance index, where m represents the total number of performance indices, as shown at blocks 48, 50 and 52. The Response Surfaces are represented by, $p_i=f_i(N, X)$, i=1, . . . , m, where m represents the total number of performance indices. By way of example only, software such as Abaqus may be used for structural assessment and software such as 3DCS may be used for dimensional assessment. Any other suitable software may be used.

The Performance Feasibility Function, P(N, X) (shown at block 14), is represented by a weighted summation of the response surfaces for each performance index, $$P(N, X) = \sum_{i=1}^{m} w_i p_i(N, X).$$

The weighting factor $w_i$ represents the relative importance of each performance index. Alternatively, the Performance Feasibility Function 14 can be represented by a multiplication of the response surfaces for each performance index or an exponential function of the response surfaces. Any other suitable mathematical function can also be employed. Note that performance is considered feasible if and only if $p_i(N, X) \geq (p_i)_{thresh}$, where $(p_i)_{thresh}$ represents threshold vehicle performance specification.

Each performance index $p_i(N, X)$, (i=1, . . . m) may be influenced by multiple sub-factors. The sub-factors for the crashworthiness performance index include, but are not limited to: (a) frontal impact with a rigid barrier; (b) side pole impact; (c) rear impact; and (d) rollover occupant simulation. Taking crashworthiness to be the first performance index, the response surface $p_1(N, X)$ would be a weighted summation of the response surfaces for each of the crashworthiness sub-factors. Taking a weighting factor $a_i$ to represent the relative importance of each sub-factor, the response surface $p_1(N, X)$ is:

$$p_1(N,X)=a_1 p_{frontal\ impact}+a_2 p_{side\ pole\ impact}+a_3 p_{rear\ impact}+a_4 p_{rollover\ occupant}+\cdots$$

The sub-factors for the noise-vibration-harshness performance index include, but are not limited to: (a) normal mode analysis; (b) harmonic excitation response analysis; and (c) static and dynamic stiffness analysis. Taking noise-vibration-harshness to be the second performance index, and a weighting factor $b_i$ to represent the relative importance of each sub-factor, the response surface $p_2(N,X)$ is:

$$p_2(N,X)=b_1 p_{normal\ mode\ analysis}+b_2 p_{harmonic\ excitation\ response\ analysis}+b_3 p_{static\ and\ dynamic\ stiffness\ analysis}+\cdots$$

The sub-factors for the structure performance index include, but are not limited to: (a) static stress and deformation analysis for fuel tank; and (b) displacement analysis for a door assembly. Taking structure to be the third performance index, and a weighting factor $c_i$ to represent the relative importance of each sub-factor, the response surface $p_3(N,X)$ is:

$$p_3(N,X)=c_1 p_{static\ stress\ and\ deformation\ analysis\ for\ fuel\ tank}+c_2 p_{displacement\ analysis\ for\ a\ door\ assembly}+\cdots$$

The sub-factors for the dimension performance index include, but are not limited to: (a) variation analysis for compliant assemblies, such as uniform gap fitting and flushness; and (b) welding sequence analysis. Taking dimension to be the third performance index, and a weighting factor $d_i$ to represent the relative importance of each sub-factor, the response surface $p_4(N,X)$ is:

$$p_4(N,X)=d_1 p_{variation\ analysis\ for\ compliant\ assemblies}+d_2 p_{welding\ sequence\ analysis}+\cdots$$

In the example above, the initial weld design 20 includes a fixed number of weld points, N, and the method 10 can be repeated with another initial weld design 20 containing fewer or more weld points N. For each initial weld design 20, N can also change according to the specification of the vDOE, since N is also design variable. Thus the variables for the initial weld design 20 will be (N,X), or (X) when N is fixed. The method 10 of weld design, shown in FIG. 1A, can be applied at a component level (such as a two-part assembly), a sub-assembly level (such as a front end assembly) or a full vehicle level. The method 10 can be used to include weld manufacturability during the weld design stage, reducing or eliminating the need for manufacturing validations and possible re-designs. The method 10 can also be used to optimize any type of design by concurrent consideration of multiple factors.

Optimized Weld Design

As noted above, in a first embodiment, the Optimized Weld Design 12, denoted by W, may be determined by minimizing an Objective Function, defined as W=N−P(N, X). The Optimized Weld Design 12 must satisfy the Manufacturing Feasibility Workspace 16 (denoted by $\Omega_m$) (that is, X should be an element of the Manufacturing Feasibility Workspace 16). The Optimized Weld Design 12 also satisfies threshold performance requirements, such that $p_i(N, X) \geq (p_i)_{thresh}$, where $(p_i)_{thresh}$ represents threshold vehicle performance specification. In this case, the optimized weld design is configured to have a minimum number of welds N.

In a second embodiment, the optimized weld design may be determined by minimizing the performance feasibility function within the manufacturing feasible region, such that W=−P(N, X). The Optimized Weld Design 12 also satisfies the Manufacturing Feasibility Workspace 16, and threshold performance requirements such that $p_i(X) \geq (p_i)_{thresh}$. Note that when the number of welds N is a design variable, the minimized function will be W=−P(X,N). When the number of welds is fixed, the minimized function will be W=−P(X).

Referring to FIG. 1A, in step 102, the initial weld design 20 is selected and set as an input into the method 10. As previously stated, the initial weld design 20 is represented mathematically as vector (N, X)] with a total number of number of welds N and the spatial position of each weld point being X. In step 104, the geometric characteristics of the work piece or work piece geometry 18 is entered as another input into the method 10. In step 106, the weld gun selection 22 (type of weld gun to be used) is made. In step 108, a weld gun workspace 30 is selected. The weld gun workspace 30 refers to regions on the work piece that can be physically accessed or reached by the weld gun, without colliding with other components. In step 110, a fixture selection 24 (type of fixture to be used) is made. This results in the selection of a fixture workspace 32 in step 112. The fixture workspace 32 refers to regions on the work piece that can be physically accessed or reached by the fixture, without colliding with other components. In step 112, a robot selection 26 (type of robot to be used) is made. This results in the selection of a robot workspace 34 in step 114. The robot workspace 34 refers to regions on the work piece that can be physically accessed or reached by the robot, without colliding with other components. In step 116, a welding standards 28 is selected. This results in the selection of a welding standards workspace 36 in step 118. The welding standards workspace 36 refers to minimum welding requirements, examples of which were given previously. In step 120, a manufacturing feasible region of the work piece is determined which satisfies at least one manufacturing requirement. In this example, the manufacturing feasible region of the work piece is the intersection of the weld gun workspace 30, fixture workspace 32, robot workspace 34 and the welding standards workspace 36 and represents a common region in which multiple manufacturing requirements are satisfied (see FIG. 2 showing manufacturing feasible region 62 and described below).

Referring to FIG. 1A, in step 124, the spatial position of each of the weld points in the initial weld design is varied between multiple values and a first performance simulation is carried out for each of the multiple values of the weld points for a first performance index representing a first performance standard, e.g. crashworthiness. In step 126, a second performance simulation is carried for each of the multiple values of the weld points for a second performance index representing a second performance standard, e.g. noise-vibration-harshness. This step is repeated for as many performance indices as needed for the particular application. In step 128, a first performance response surface (represented by $p_1=f_1(N, X)$) is generated for the first performance index with the results of the first performance simulation. In step 130, a second performance response surface (represented by $p_2=f_2(N, X)$) is generated for the second performance index with the results of the second performance simulation. The first and second performance response surfaces represent the effect on the first and second performance indices, respectively, of varying the spatial position of each of the weld points in the initial weld design 20. For an initial weld design 20 with two weld points, one at position $x_1$, and another at position $x_2$, the performance response surface may be a polynomial function $p(x_1, x_2)=c_1 \cdot x_1+c_2 \cdot x_2+c_3 \cdot x_1^2+c_4 \cdot x_2^2+c_5 \cdot x_1 \cdot x_2$. The first and second performance response surfaces may be generated with intermediate steps 125 and 127, respectively, in which the first and second performance simulation results obtained in steps 124 and 126, respectively, (for multiple values of the weld points) are inputted into an algorithm, software or Design of Experiments (DOE) table in order to determine the constants $c_1$, $c_2$, $c_3$, $c_4$ and $c_5$ corresponding to each of the first and second performance response surfaces.

Referring to FIG. 1A, in step 132, a performance feasibility function for the work piece is calculated as a weighted summation of each of the performance response surfaces, such that the performance feasibility function is a weighted composite performance index. The performance feasibility function, P(N, X), is represented by a weighted summation of the response surfaces for each performance index, $$P(N, X) = \sum_{i=1}^{m} w_i p_i(N, X).$$

The weighting factor $w_i$ represents the relative importance of each performance index. In step 134, an optimized weld design is determined by minimizing the negative of the performance feasibility function while constrained by the manufacturing feasible region [represented by W=−P(N, X)]. The optimized weld design is configured to concurrently satisfy the predetermined manufacturing requirements and the performance factors represented by the performance feasibility function. Alternatively, the optimized weld design is determined by minimizing an objective function while constrained by the manufacturing feasible region, the objective function being defined as a summation of the varying number of welds and negative of the performance feasibility function [represented by W=N−P(N, X)].

Sample Results

FIG. 2 is a schematic representation of a sample result of the method 10 of weld design, in accordance with the second embodiment described above. FIG. 3 is a schematic cross-sectional diagram of a work piece 54 that includes a first sheet metal 56 placed above a second sheet metal 58. The first and second sheet metals 56, 58 are to be spot welded along their abutting surfaces or interface 60 (shown in FIGS. 2 and 3). The interface 60 is also known as the weld flange. The initial weld design for the work piece 54 includes three weld points, with initial locations across the interface 60, shown at 64, 76, 90, and described below.

A manufacturing feasible workspace, shown by the dotted area 62 in FIG. 2, is determined for the interface 60 with respect to the selected weld gun, robot, fixture and welding standard. The manufacturing feasible region 62 is the same as the Manufacturing Feasible Workspace 16 shown in FIG. 1A and described above. Next, three performance indices are formulated and response surfaces for each are generated by perturbing the initial location of each weld point.

Note that this example shows only single variable response surfaces, i.e., in this case only the position of one weld can be moved around. It is possible that all three welds can be considered to move simultaneously, which would result in a three-variable virtual DOE study and three-variable response surfaces. The response surfaces are generally represented by multi-variable polynomials. Since FIG. 2 shows a single variable response surface, each response surface p(N,x) may be represented by a mathematical function, such as a quadratic polynomial:

$$p(x)=c_1+c_2 \cdot x+c_3 \cdot x^2$$

The first weld point has an initial location 64. FIG. 2 shows a crashworthiness response surface 66 associated with the first weld, a noise-vibration-harshness response surface 68 associated with the first weld, and a structure response surface 70 associated with the first weld. The optimized weld design for the first weld point is determined by minimizing the negative of the weighted summation of the three response surfaces 66, 68, 70, subject to the constraints of the manufacturing feasible region 62, in accordance with the second embodiment described above. The optimal location for the first weld point is then determined to be at 74.

Weld positions on the interface 60 which are near the central peak of a response surface, e.g. the center of the crashworthiness response surface 66, produce the best results with respect to that performance index, i.e., crashworthiness. Weld positions on the interface 60 that lie within the boundaries of the response surface produce results within the acceptable limits for that performance index, while weld positions outside the boundaries of the response surface produce results outside the acceptable limits. It is assumed that minimum performance threshold requirements are met here. Throughout the example, the number of welds is fixed at three and is not optimized.

The second weld point has an initial location 76. Response surfaces are generated for the second weld point for the three performance indices selected. FIG. 2 shows a crashworthiness response surface 78 associated with the second weld, a noise-vibration-harshness response surface 80 associated with the second weld, and a structure response surface 82 associated with the second weld. The optimized weld design for the second weld point is determined by minimizing the negative of the weighted summation of the three response surfaces 78, 80, 82, subject to the constraints of the manufacturing feasible region 62, in accordance with the second embodiment described above. The optimal location for the second weld point is then determined to be at 86.

The third weld point has an initial location 90. FIG. 2 shows a crashworthiness response surface 92 associated with the third weld, a noise-vibration-harshness response surface 94 associated with the third weld, and a structure response surface 96 associated with the third weld, generated for the third weld point. The optimized weld design for the third weld point is determined by minimizing the negative of) the weighted summation of the three response surfaces 92, 94, 96, subject to the constraints of the manufacturing feasible region 62, in accordance with the second embodiment described above. The optimal location for the third weld point is then determined to be at 100.

In the example shown in FIG. 2, the response surfaces are determined for each weld point individually such that the performance interaction among different welds are not considered. In another embodiment, a response surface can also be made for multiple welds, such as any two weld points having the initial location 64, 76 and 90 in FIG. 2 (which leads to a two-variable response surface), or all three weld points together (which leads to a three-variable response surface). More variables are permitted. In another embodiment, a response surface can also be made for a clustered, multiple weld points together, where the weld points within the cluster have a fixed relative location so that the number of design variables can be reduced.

As noted above, in this example the number of welds is fixed at three and is not optimized. In a different embodiment, the total number of welds, N, may be taken as a design variable and varied according to certain specifications, e.g., the weld density (or number of welds per unit area). The variables N and X, may both be variables in the response surface construction.

While the best modes for carrying out the invention have been described in detail, those familiar with the art to which this invention relates will recognize various alternative designs and embodiments for practicing the invention within the scope of the appended claims.

The invention claimed is:

1. A method of weld design for a work piece, the method comprising:
    selecting an initial weld design as an input, the initial weld design representing one or more weld points each having a spatial position;
    entering geometric characteristics of the work piece as another input;
    determining a manufacturing feasible region of the work piece satisfying at least one predetermined manufacturing requirement including accessibility of welding components;
    determining a performance feasibility function for the work piece satisfying at least one predetermined performance factor as applied in a performance simulation of the work piece; and
    determining an optimized weld design representing one or more optimized weld points by minimizing the negative of the performance feasibility function while constrained by said manufacturing feasible region such that each of the optimized weld points is within the manufacturing feasible region, said optimized weld design being configured to concurrently satisfy said predetermined manufacturing requirement and said performance factor without requiring iteration.

2. The method of claim 1, wherein said determining a performance feasibility function includes:
    varying the spatial position of each of the weld points in the initial weld design between multiple values;
    carrying out a first performance simulation for each of the multiple values of the weld points for a first performance index representing a first performance standard;
    carrying out a second performance simulation for each of the multiple values of the weld points for a second performance index representing a second performance standard;
    generating first and second performance response surfaces for said first and second performance indices based upon results of said first and second performance simulations, wherein the first and second performance response surfaces are functions representing first and second performance response with respect to the spatial position of each of the weld points;
    calculating said performance feasibility function as a weighted summation of said first and second performance response surfaces, such that said performance feasibility function is a weighted composite performance index.

3. The method of claim 2, wherein said first and second performance response surfaces are polynomial functions.

4. The method of claim 2, wherein said performance indices include: a crashworthiness index; noise-vibration-harshness index; structure index; and dimension index.

5. A method of weld design for a work piece, the method comprising:
    selecting an initial weld design as an input, the initial weld design representing one or more weld points each having a spatial position;
    entering geometric characteristics of the work piece as another input;
    determining a manufacturing feasible region of the work piece satisfying each of multiple predetermined manufacturing requirements including accessibility of welding components, said workpiece having a varying number of welds;
    calculating a performance feasibility function for the work piece as a weighted summation of at least one predetermined performance factor as applied in a performance simulation of the work piece;
    determining an optimized weld design representing one or more optimized weld points by minimizing an objective function while constrained by said manufacturing feasible region such that each of the optimized weld points is within the manufacturing feasible region, said objective function being defined as a summation of said varying number of welds and negative of said performance feasibility function; and
    wherein said optimized weld design is configured to concurrently satisfy said predetermined manufacturing requirements and said performance indices without requiring iteration, with a minimum number of welds.

6. The method of claim 5, wherein said predetermined manufacturing requirement includes welding standards.

7. The method of claim 5, wherein:
    a fixture is used to hold said work piece during welding; and
    said predetermined manufacturing requirement includes a fixture accessibility requirement.

8. The method of claim 5, wherein:
    a weld gun is used to weld said work piece; and
    said predetermined manufacturing requirement includes a weld gun accessibility requirement.

9. The method of claim 8, wherein:
    a robot is used to operate said weld gun; and
    said predetermined manufacturing requirement includes a robot accessibility requirement.

10. The method of claim 5, wherein said determining a performance feasibility function includes:
    varying the spatial position of each of the weld points in the initial weld design between multiple values;
    carrying out a first performance simulation for each of the multiple values of the weld points for a first performance index representing a first performance standard;
    carrying out a second performance simulation for each of the multiple values of the weld points for a second performance index representing a second performance standard;
    generating first and second performance response surfaces for said first and second performance indices based upon results of said first and second performance simulations, wherein the first and second performance response surfaces are functions representing first and second performance response with respect to the spatial position of each of the weld points;
    calculating said performance feasibility function as a weighted summation of said first and second performance response surfaces, such that said performance feasibility function is a weighted composite performance index.

11. The method of claim 10, wherein said first and second performance response surfaces are polynomial functions.

12. The method of claim 10, wherein said performance indices include a crashworthiness performance index.

13. The method of claim 12, wherein the response surface of said crashworthiness performance index is a weighted summation of response surfaces for a plurality of crashworthiness sub-factors, said crashworthiness sub-factors including:

frontal impact with a rigid barrier;
side pole impact;
rear impact; and
rollover occupant simulation.

14. The method of claim 10, wherein said performance indices include a noise-vibration-harshness performance index.

15. The method of claim 14 wherein the response surface of said noise-vibration-harshness performance index is a weighted summation of response surfaces for a plurality of noise-vibration-harshness sub-factors, said noise-vibration-harshness sub-factors including:
normal mode analysis;
harmonic excitation response analysis; and
static and dynamic stiffness analysis.

16. The method of claim 10, wherein said performance indices include a structure performance index.

17. The method of claim 16 wherein the response surface of said structure performance index is a weighted summation of response surfaces for a plurality of structure sub-factors, said structure sub-factors including:
static stress and deformation analysis for a fuel tank; and
displacement analysis for a door assembly.

18. The method of claim 10, wherein said performance indices include a dimension performance index.

19. A non-transitory computer-readable storage medium containing a set of instructions for a general purpose computer for enabling a method of weld design for a workpiece, the set of instructions comprising:
instructions for determining a manufacturing feasible region of the work piece satisfying at least one predetermined manufacturing requirement including accessibility of welding components;
instructions for determining a performance feasibility function for the work piece satisfying at least one predetermined performance factor as applied in a performance simulation of the work piece; and
instructions for determining an optimized weld design representing one or more optimized weld points by minimizing the negative of the performance feasibility function while constrained by said manufacturing feasible region such that each of the optimized weld points is within the manufacturing feasible region, said optimized weld design being configured to concurrently satisfy said predetermined manufacturing requirement and said performance factor without requiring iteration.

20. The method of claim 1, wherein:
a fixture is used to hold said work piece during welding;
a weld gun is used to weld said work piece;
a robot is used to operate said weld gun; and
said predetermined manufacturing requirement includes welding standards, a fixture accessibility requirement, a weld gun accessibility requirement and a robot accessibility requirement.

* * * * *